(12) United States Patent
Jing et al.

(10) Patent No.: US 12,003,843 B2
(45) Date of Patent: Jun. 4, 2024

(54) DRIVING ASSEMBLY WITH REDUCED SIZE AND NOISE, CAMERA MODULE AND ELECTRONIC DEVICES HAVING THE SAME

(71) Applicant: TRIPLE WIN TECHNOLOGY(SHENZHEN) CO.LTD., Shenzhen (CN)

(72) Inventors: Zhuang-Zhuang Jing, Tianjin (CN); Jing-Wei Li, Guangdong (CN); Shin-Wen Chen, New Taipei (TW)

(73) Assignee: TRIPLE WIN TECHNOLOGY(SHENZHEN) CO.LTD., Shenzhen (CN)

( * ) Notice: Subject to any disclaimer, the term of this patent is extended or adjusted under 35 U.S.C. 154(b) by 237 days.

(21) Appl. No.: 17/731,542

(22) Filed: Apr. 28, 2022

(65) Prior Publication Data

US 2023/0066451 A1    Mar. 2, 2023

(30) Foreign Application Priority Data

Aug. 27, 2021    (CN) .......................... 202110996052.9

(51) Int. Cl.
*H04N 23/57* (2023.01)
*H04N 23/55* (2023.01)

(52) U.S. Cl.
CPC ............. *H04N 23/57* (2023.01); *H04N 23/55* (2023.01)

(58) Field of Classification Search
CPC ........ H04N 23/57; H04N 23/55; H04N 23/54; H04N 23/58
See application file for complete search history.

(56) References Cited

U.S. PATENT DOCUMENTS

| | | | |
|---|---|---|---|
| 2022/0137486 A1* | 5/2022 | Oh | G02B 7/08 359/554 |
| 2023/0033567 A1* | 2/2023 | Chang | H04N 23/687 |
| 2023/0044313 A1* | 2/2023 | Shen | G03B 3/10 |

FOREIGN PATENT DOCUMENTS

CN    109752814 A    5/2019

* cited by examiner

*Primary Examiner* — Michael E Teitelbaum
(74) *Attorney, Agent, or Firm* — ScienBiziP, P.C.

(57) ABSTRACT

A drive assembly with reduced size and reduced noise includes a bottom box, an elastic member, a movable plate, a PCB board, and a plurality of shape memory alloy wires. The bottom box comprises a bottom plate and a plurality of side plates. The plurality of side plates is arranged on a side of the bottom plate to form a receiving groove, the plurality of side plates defines a position groove connects to the receiving groove. The elastic member, the movable plate, the plurality of shape memory alloy wires, and a partial of the rigid printed circuit board are located within the receiving groove, another partial of the rigid printed circuit board is disposed with the position groove. The elastic member connects between the bottom plate and the movable plate, the plurality of shape memory alloy wires connects between the movable plate and the rigid printed circuit board.

20 Claims, 8 Drawing Sheets

DRIVING ASSEMBLY WITH REDUCED SIZE AND NOISE, CAMERA MODULE AND ELECTRONIC DEVICES HAVING THE SAME

FIELD

The subject matter herein generally relates to imaging devices, and more particularly, to a driving assembly with reduced size and noise, a camera module having the lens base, and an electronic device having the camera module.

BACKGROUND

A mobile camera with an Optical Image Stabilization (OIS) function mainly include a camera assembly, a VCM, a sensor, and a PCB. The camera assembly is movably arranged inside the VCM, and the VCM driving motor drives the camera assembly to move. The sensor connects to the PCB and faces the camera assembly. However, the VCM is relatively big in size, which limits the miniaturization of the mobile camera. Furthermore, the VCM may generate noises while working, which may not meet the users' needs.

BRIEF DESCRIPTION OF THE DRAWINGS

Implementations of the present technology will now be described, by way of example only, with reference to the attached figures.

DETAILED DESCRIPTION

Figure 1:
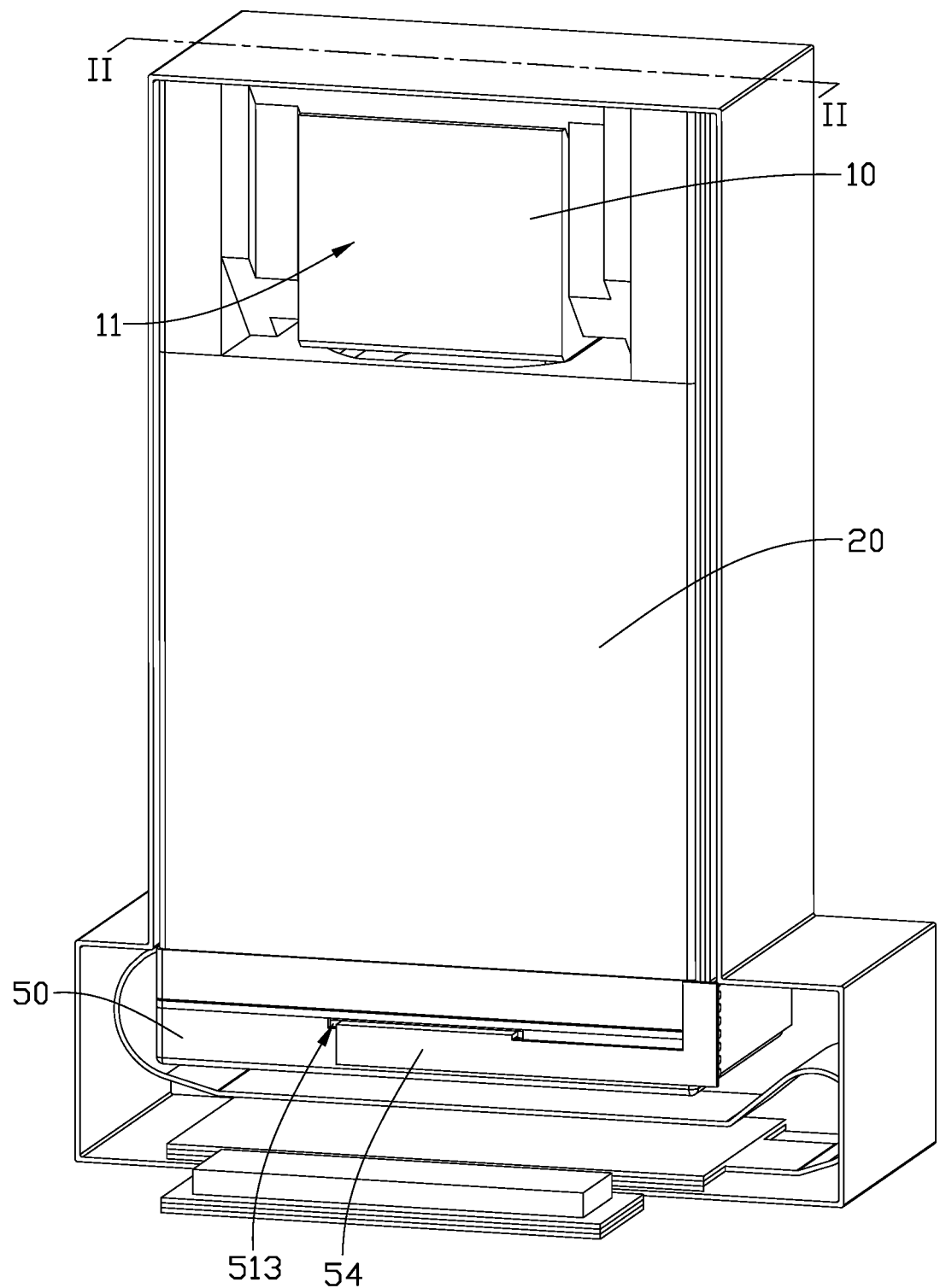
FIG. 1 is a diagrammatic view of a camera module according to an embodiment of the present disclosure.

It will be appreciated that for simplicity and clarity of illustration, where appropriate, reference numerals have been repeated among the different figures to indicate corresponding or analogous elements. In addition, numerous specific details are set forth to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale, and the proportions of certain parts may be exaggerated to better illustrate details and features of the present disclosure.

The disclosure is illustrated by way of example and not by way of limitation in the figures of the accompanying drawings, in which like references indicate similar elements. It should be noted that references to "an" or "one" embodiment in this disclosure are not necessarily to the same embodiment, and such references mean "at least one."

The term "comprising," when utilized, means "including, but not necessarily limited to"; it specifically indicates open-ended inclusion or membership in the so-described combination, group, series, and the like.

Figure 2:
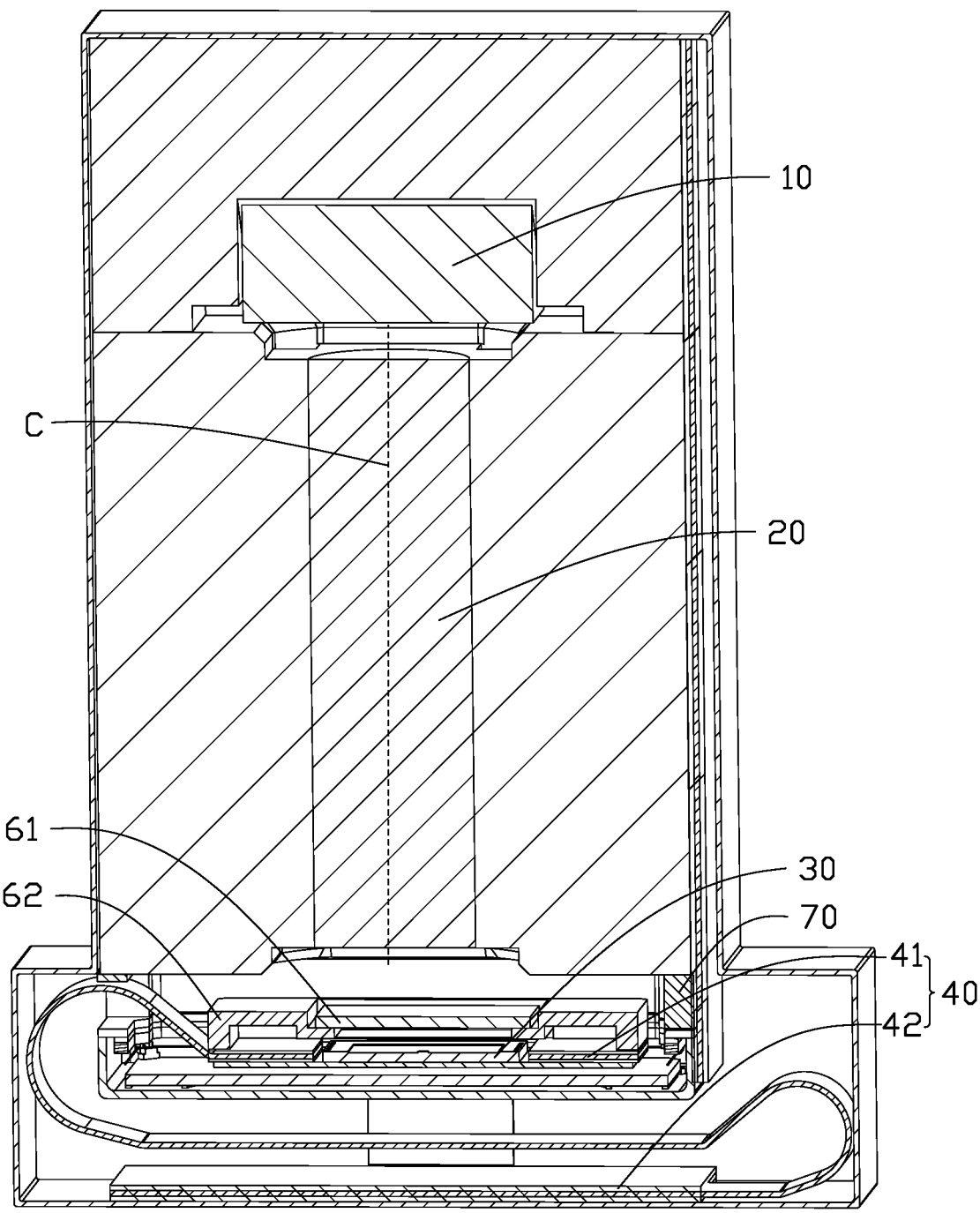
FIG. 2 is a cross-sectional view along line II-II of FIG. 1.

Referring to FIGS. 1 and 2, an embodiment of a camera module 100 is provided. The camera module 100 includes an optical prism 10, a lens assembly 20, a sensor 30, a flexible printed circuit board 40, and a driving assembly 50.

Figure 3:
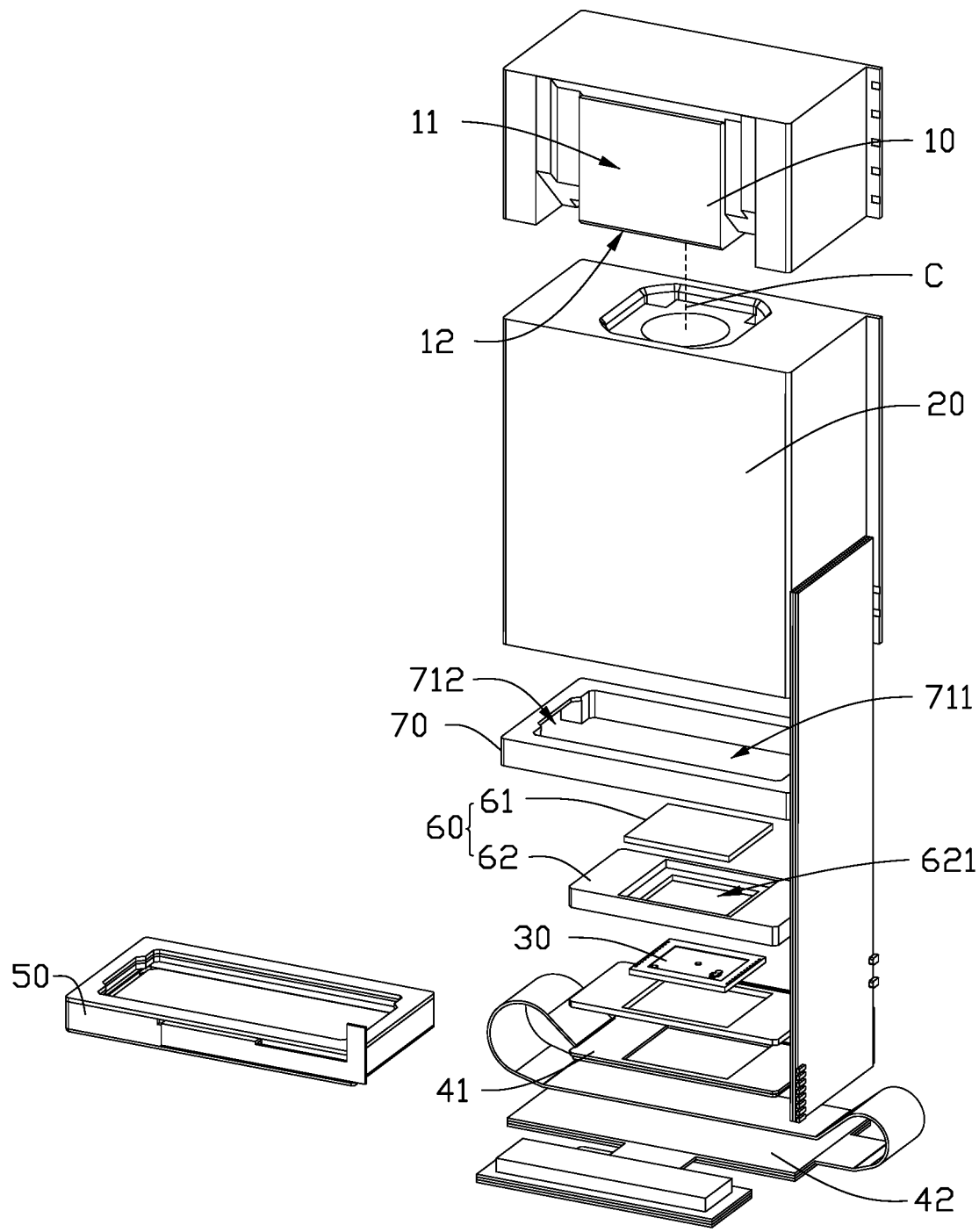
FIG. 3 is an exploded view of camera module of FIG. 1.

Referring to FIG. 3. the lens assembly 20 includes an object side (not shown) that faces an object (not shown) to be captured and an imaging side (not shown) that faces the sensor 30. The optical prism 10 is arranged on the object side. The optical prism 10 includes a first surface 11 and a second surface 12. The first surface 11 and the second surface 12 intersect with each other to form an included angle of 90 degrees. The first surface 11 faces the object to be captured, and the second surface 12 faces the lens assembly 20. The light reflected from the object travels into the optical prism 10 through the first surface 11, and exits the optical prism 10 through the second surface 12. The lens assembly 20 includes a plurality of optical lens 21. The optical lens 21 focus the light coming out from the second surface 12 to form optical signals, and the sensor 30 transfers the optical signals into a digital signal (not shown).

The flexible printed circuit board 40 includes a connecting end portion 41 and a free end portion 42. The sensor 30 is disposed on the connecting end portion 41. The digital signal transmits from the connecting end portion 41 to the free end portion 42, and transmits to another electronic component, such as a motherboard.

Referring to FIG. 2, the senor 30 and the connecting end portion 41 are arranged within the driving assembly 50. The driving assembly 50 drives the sensor 30 and the connecting end portion 41 to move, while keeping an optical axis C of the lens assembly 20 to be perpendicular to the sensor 30. For example, when the camera module 100 is tilted to a side, the optical axis C of the lens assembly 20 would be deviated from its original position. Then, the driving assembly 50 would drive the sensor 30 move to an opposite side, which makes the optical axis C of the lens assembly 20 be perpendicular to the sensor 30 again. Hence the camera module 100 has an Optical Image Stabilization function.

Figure 4:
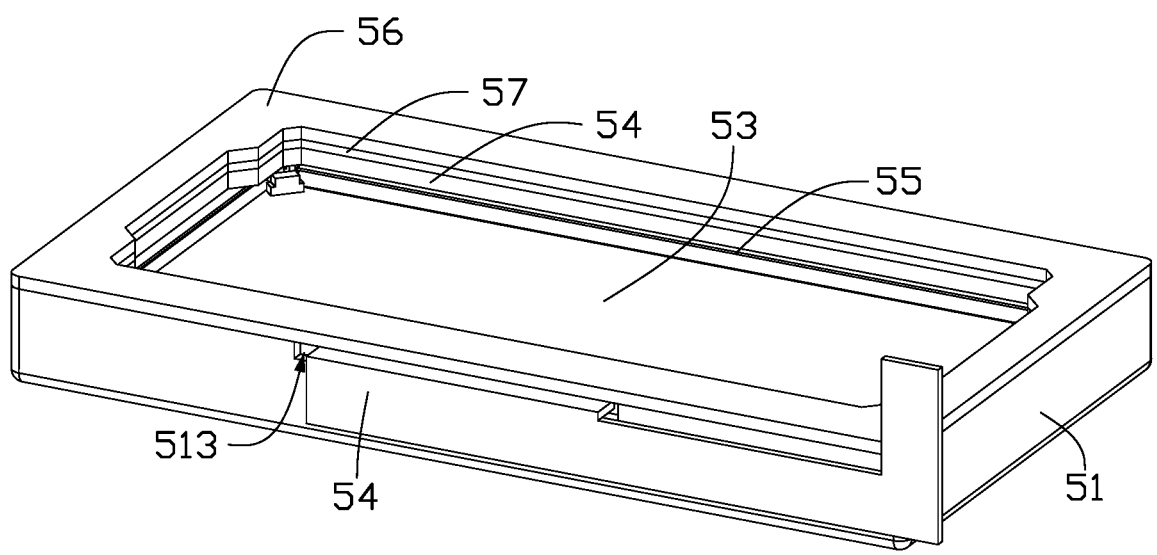
FIG. 4 is a diagrammatic view of a driving assembly of the camera module of FIG. 1.
Figure 5:
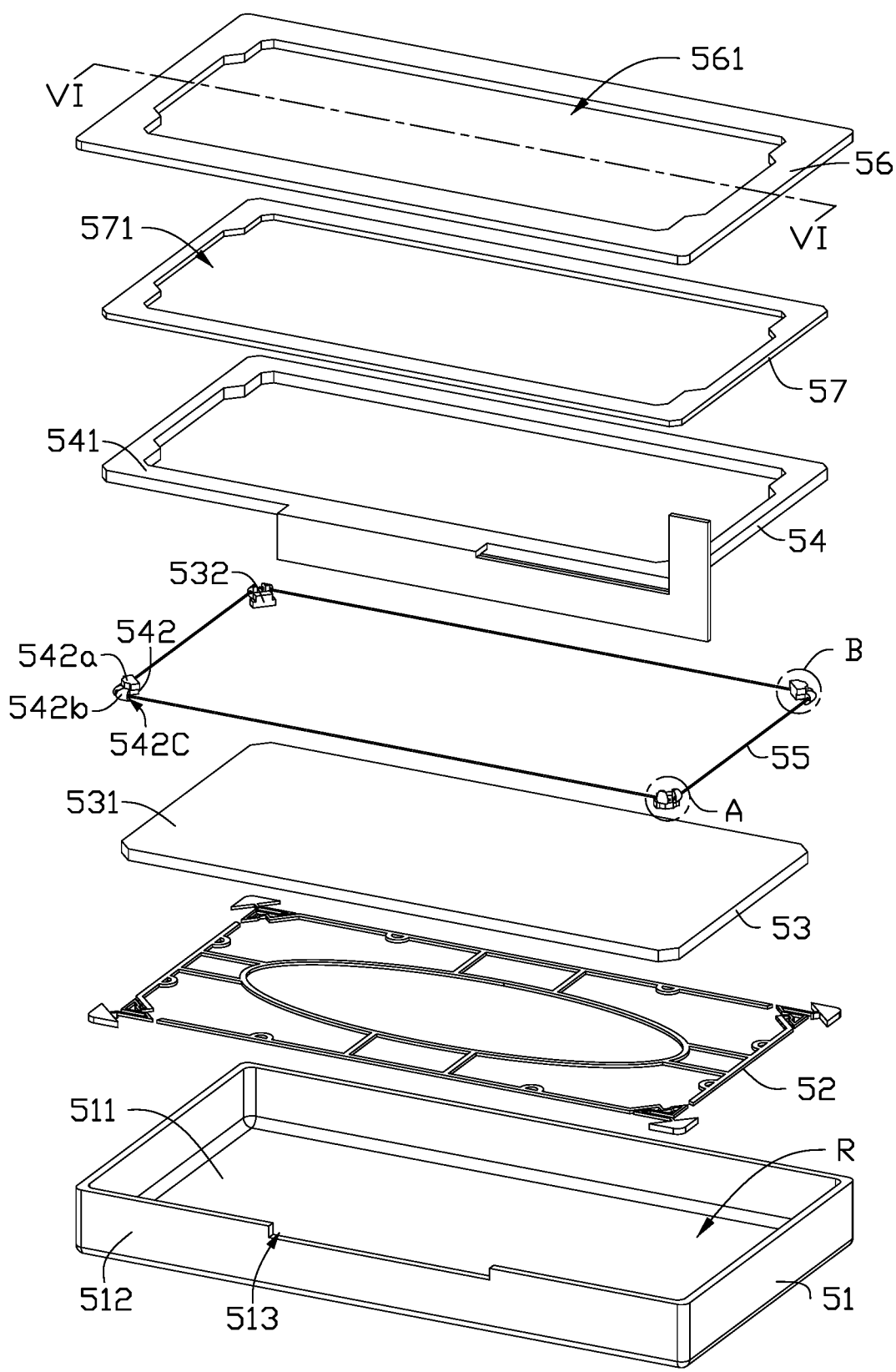
FIG. 5 is an exploded view of driving assembly of FIG. 4.

Referring to FIG. 4 and FIG. 5, in this embodiment, the driving assembly 50 includes a bottom box 51, an elastic member 52, a movable plate 53, a rigid print circuit board 54, and a plurality of shape memory alloy wires 55. The bottom box 51 includes a bottom plate 511 and a plurality of side plates 512. The side plates 512 are connect to the bottom plate 511 to form a receiving groove R. One of the side plates 512 defines a position groove 513. The position groove 513 penetrates the side plate 512 and connects to the receiving groove R. The elastic member 52, the movable plate 53, the shape memory alloy wires 55, and a portion of the rigid print circuit board 54 are arranged within the receiving groove R. Another portion of the rigid print circuit board 54 goes through the position groove 513 and electrically connects to the free end portion 42. The elastic member 52 elastically abut between the bottom plate 511 and the movable plate 53. The shape memory alloy wires 55 connect between the movable plate 53 and the rigid print circuit board 54.

When the camera module 100 is tilted to a side, the rigid print circuit board 54 provides an electrical current to the shape memory alloy wires 55. The electrical current heat the shape memory alloy wires 55 to cause the shape memory alloy wires 55 to deform. The shape memory alloy wires 55, after such deformation, drive the movable plate 53 to move to an opposite side. The movable plate 53 further drives the sensor 30 to move, thereby causing the optical axis C to be perpendicular to the sensor 30 again.

When the camera module 100 is in the right position, the rigid print circuit board 54 stops to energize the shape memory alloy wires 55, so that the shape memory alloy wires 55 return to its original shape. Meanwhile, the elastic member 52 drives the movable plate 53 to return to its original position on which the optical axis C is perpendicular to the sensor 30.

With the above configuration, the driving assembly 50 uses shape memory alloy 55 and the elastic member 52 to drive the movable plate 53 to move back and forth, so that the sensor 30 arranged on the movable plate 53 also moves. As such, the optical axis C remains to be perpendicular to the sensor 30. Compared to an existing VCM motor, the driving assembly 50 can have a smaller size and produce less noise while working.

Figure 6:
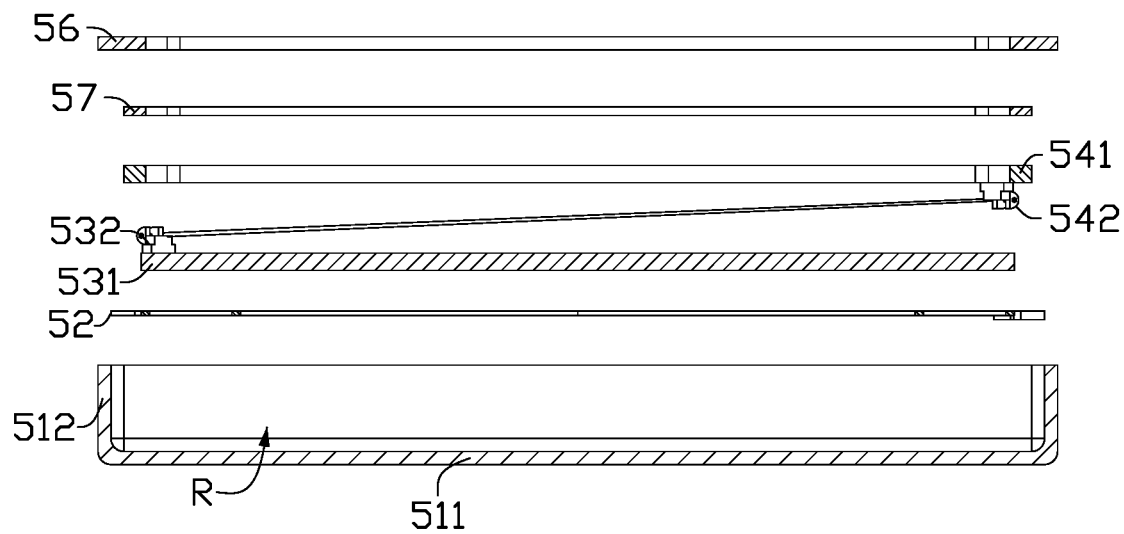
FIG. 6 is a cross-sectional view along line VI-VI of FIG. 4.

Referring to FIG. 5 and FIG. 6, in this embodiment, the movable plate 53 includes a movable body 531 and a plurality of first connecting claws 532, the first connecting claws 532 are spaced on a side of the movable body 531. The rigid printed circuit board 54 includes a main board 541 and a plurality of second connecting claws 542, the second connecting claws 542 are spaced on a side of the main board 541 facing the first connecting claw 532. One end of a shape memory wire 55 connects to the first connecting claw 532, another end of a shape memory wire 55 connects to the second claw 542. Each of the first connecting claws 532 connects a least two shape memory wires 55. Each of the second connecting claws 542 connects a least two shape memory wires 55. By connecting both ends of the shape memory alloy wire 55 to the first connecting claw 532 and the second connecting claws 542, when the shape memory alloy wire 55 is deformed, the shape memory alloy wire 55 can drag the movable body 531 to move.

Referring to FIG. 5 and FIG. 6, in this embodiment, the movable body 531 is in rectangular shape, the first connecting claws 532 are disposed in the diagonal position of the rectangular movable body 531. The rigid printed circuit board 54 is in rectangular shape, the second connecting claws 542 are disposed in the diagonal position of the rectangular rigid circuit board 54. The first connecting claws 532 and the second connecting claws 542 are configured alternatively. Each first connecting claws 532 or each second connecting claws 542 connects to two shape memory alloy wires 55 oriented in different direction.

Figure 7A:
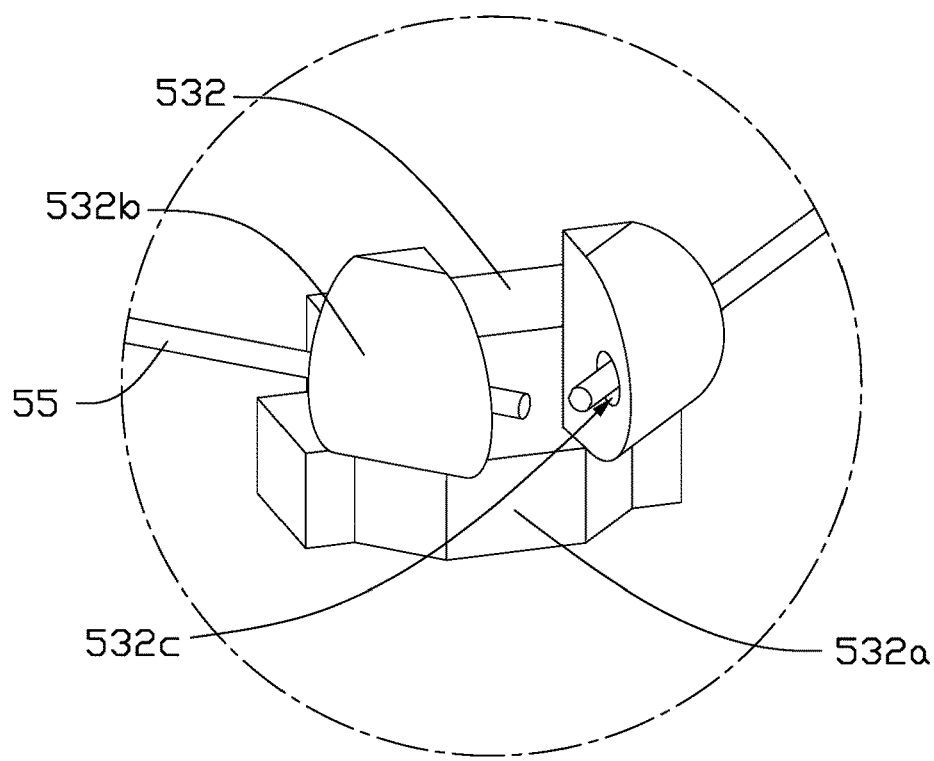
FIG. 7A is an enlarged view of section A of FIG. 5.
Figure 7B:
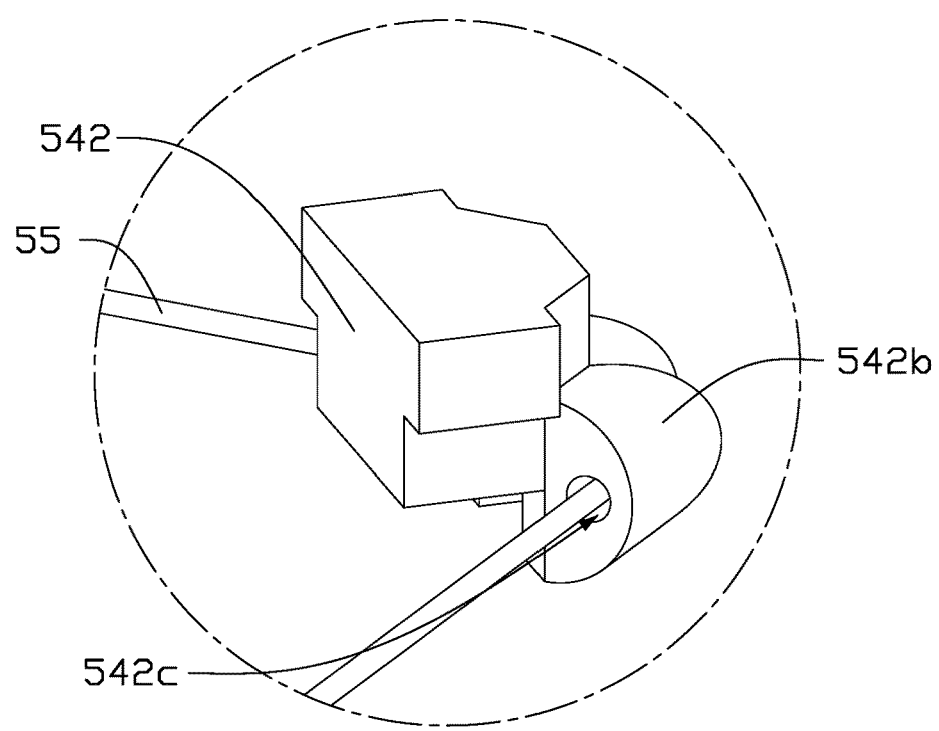
FIG. 7B is an enlarged view of section B of FIG. 5.

Referring to FIG. 7A, in this embodiment, each first connecting claw 532 includes a first base 532a and a plurality of first connecting portions 532b. The first connecting portions 532b are disposed on a side of the first base 532a. Each first connecting portion 532b defines a plurality of first threading hole 532c, the first threading holes 532c are staggered on the same first base 542b. One end portions of the shape memory alloy wire 55 is arranged within the first threading hole 532c, such that to produce a rotation torque acting on the circuit board body 541. Similarly, Referring to FIG. 7B, each second connecting claw 542 includes a second base 542a and a plurality of second connecting portions 542b. The second connecting portions 542b are disposed on a side of the second base 542b. Each second connecting portion 542b defines a plurality of second threading hole 542c, the second threading holes 542c are staggered on the same second base 542b. Another end portions of shape memory alloy wire 55 is arranged within the second threading hole 542c, such that produce a rotation torque acting on the movable body 531.

Referring to FIG. 4 and FIG. 5, in this embodiment, the driving assembly 50 includes a cover plate 56 and an insulating plate 57. The cover plate 50 covers the side plate 512. The insulating plate 57 is arranged between the cover plate 56 and the main board 541. The insulating plate 57 defines a first through hole 571, the cover plate 56 defines a second through hole 561, the first through hole 571 faces the second through hole 561. The connecting end portion 41 of the flexible printed circuit board 40 passes through the first through hole 571 and the second through hole 561 to connect partial of the movable body 531.

Referring to FIG. 4 and FIG. 5, in this embodiment, the elastic member 52 is a spring, one end of which connect to the movable body 531 by a heat conductive glue, another end of which connect to the bottom plate 511 by solder or heat conductive glue. Such that facilitate heat conduction between the sensor 30 and the bottom plate 511.

Referring to FIG. 2 and FIG. 3, in this embodiment, the camera module 100 includes optical filter 60. The optical filter 60 is arranged between the lens assembly 20 and the driving assembly 50. The optical filter 60 includes a filter sheet 61 and a fixing frame 62. The fixing frame 62 defines a first aperture 621. The connecting end portion 41 connects a side of the fixing frame 62. The sensor 30 faces the first aperture 621, the filter sheet 61 is disposed on another side of the fixing frame 62. The driving assembly 50 drives the optical filter 60 and the sensor move together.

Referring to FIG. 2 and FIG. 3, in this embodiment, the camera module 100 includes a middle frame 70. The middle frame 70 is disposed between the driving assembly 50 and the lens assembly 20. The middle frame 70 includes a plurality of side walls 71, the plurality of side walls 71 connects each other to form a second aperture 711. The second aperture 711 faces the first aperture 621 to allow light pass by. The side walls 71 defines an opening 712 connects to the second aperture 711. The free end portion 42 movably go through the opening 712.

Referring to FIG. 2 and FIG. 3, in this embodiment, the camera module 100 includes a gyro chip (not shown), the gyro chip connects the free end portion 42. The rigid printed circuit board 54 is electrically connected with the gyro chip, and the gyro chip is used to sense the attitude information of the camera module, such as tilt angle, tilt direction, etc.

Figure 8:
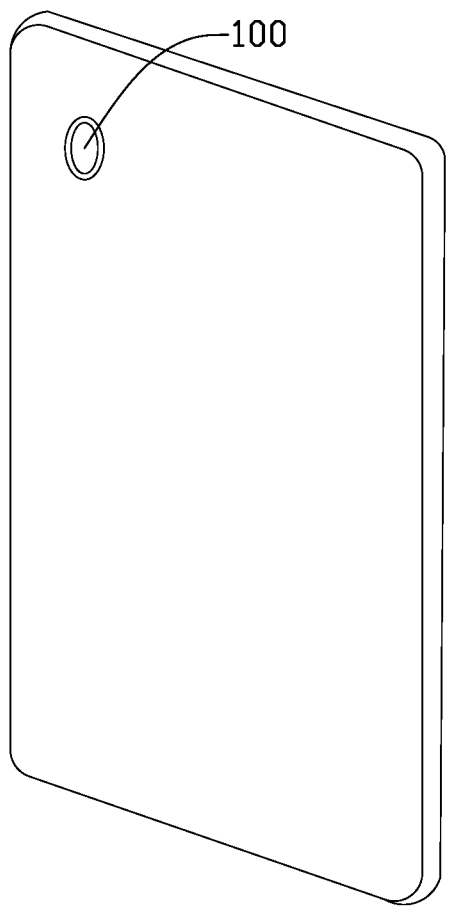
FIG. 8 is a diagrammatic view of an electronic device according to an embodiment of present disclosure.

Referring to FIG. 8, the embodiment of the application also provides an electronic device 200. The electronic device 200 includes the camera module 100. The electronic device 200 can be an electronic device with camera function such as mobile phone, computer, smart watch, handheld computer, and camera.

It is to be understood, even though information and advantages of the present embodiments have been set forth in the foregoing description, together with details of the structures and functions of the present embodiments, the disclosure is illustrative only; changes may be made in detail, especially in matters of shape, size, and arrangement of parts within the principles of the present embodiments to the full extent indicated by the plain meaning of the terms in which the appended claims are expressed.

What is claimed is:

1. A driving assembly comprising:
a bottom box,
an elastic member,
a movable plate,
a rigid printed circuit board; and
a plurality of shape memory alloy wires;

wherein the bottom box comprises a bottom plate and a plurality of side plates connected to the bottom plate, the plurality of side plates and the bottom plate cooperatively define a receiving groove, the plurality of side plates defines a position groove connecting to the receiving groove; each of the elastic member, the movable plate, the plurality of shape memory alloy wires, and a portion of the rigid printed circuit board is disposed in the receiving groove, another portion of the rigid printed circuit board is disposed in the position groove;

the elastic member connects between the bottom plate and the movable plate, the plurality of shape memory alloy wires connects between the movable plate and the rigid printed circuit board.

2. The driving assembly of claim 1, wherein the movable plate comprises a movable body and a plurality of first connecting claws, the plurality of first connecting claws is disposed on a side of the movable body, the rigid printed circuit board comprises a main body and a plurality of second connecting claws, the plurality of second connecting claws is disposed on a side of the main body facing the movable body, each of the plurality of the first connecting claws connects to one end of a corresponding one of the shape memory alloy wires, each of the plurality of the second connecting claws connects to another end of the corresponding one of the shape memory alloy wires.

3. The driving assembly of claim 1, wherein each of the plurality of first connecting claws comprises a first base and a plurality of first connecting portions, the plurality of first connecting portions is disposed on a side of the first base, each of the plurality of the first connecting portions defines a first threading hole, one end of each of the shape memory alloy wires is arranged in the first threading hole.

4. The driving assembly of claim 1, wherein each of the plurality of second connecting claws comprises a second base and a plurality of second connecting portions, the plurality of second connecting portions is disposed on a side of the second base, each of the plurality of the second connecting portions defines a second threading hole, one end of each of the shape memory alloy wires is arranged in the second threading hole.

5. The driving assembly of claim 1, further comprising a cover plate and an insulating plate, wherein the cover plate connects the plurality of side plates to cover the receiving groove, the insulating plate is disposed between the cover plate and the rigid printed circuit board.

6. The driving assembly of claim 5, wherein the insulating plate defines a first through hole, the cover plate defines a second through hole, the first through hole faces the second through hole, a portion of the movable plate is exposed from the first through hole and the second through hole.

7. The driving assembly of claim 5, wherein a first side of the elastic member connects to the movable plate by heat conductive glue, and a second side of the elastic member connects to the bottom plate by solder or heat conductive glue, the first side being opposite to the second side.

8. A camera module comprising:
a lens assembly,
a sensor,
a flexible printed circuit board, and
a driving assembly, wherein the driving assembly comprising:
a bottom box,
an elastic member,
a movable plate,
a rigid printed circuit board; and
a plurality of shape memory alloy wires;
wherein the bottom box comprises a bottom plate and a plurality of side plates connected to the bottom plate, the plurality of side plates and the bottom plate cooperatively define a receiving groove, the plurality of side plates defines a position groove connecting to the receiving groove; each of the elastic member, the movable plate, the plurality of shape memory alloy wires, and a portion of the rigid printed circuit board is disposed in the receiving groove, another portion of the rigid printed circuit board is disposed in the position groove, wherein the elastic member connects between the bottom plate and the movable plate, the plurality of shape memory alloy wires connects between the movable plate and the rigid printed circuit board, the flexible printed circuit board comprises a connecting end portion and a free end portion, the connecting portion connects the movable plate, the sensor is disposed on the connecting portion, an image side of the lens assembly faces the sensor, the flexible printed circuit board connects the rigid printed circuit board electronically.

9. The camera module of claim 8, wherein the camera module further comprises an optical filter, the optical filter is arranged between the lens assembly and the sensor.

10. The camera module of claim 9, wherein the optical filter comprises a filter sheet and a fixing frame, the fixing frame defines a first aperture, the connecting end portion is disposed on a side of the fixing frame such that the sensor faces the first aperture, the filter sheet is disposed on another side of the fixing frame.

11. The camera module of claim 10, wherein the camera module further comprises a middle frame, the middle frame is arranged between the driving assembly and the lens assembly.

12. The camera module of claim 11, wherein the middle frame comprises a plurality of side walls, the plurality of side walls connects end to end to form a second aperture, the second aperture faces the first aperture, the plurality of side walls defines an opening, the free end portion movably extends through the opening.

13. The camera module of claim 11, wherein the camera module further comprises an optical prism, the optical prism is arranged on a side of the lens assembly faces away from the sensor.

14. The camera module of claim 8, wherein the movable plate comprises a movable body and a plurality of first connecting claws, the plurality of first connecting claws is disposed on a side of the movable body, the rigid printed circuit board comprises a main body and a plurality of second connecting claws, the plurality of second connecting claws is disposed on a side of the main body facing the movable body, each of the plurality of the first connecting claws connects to one end of a corresponding one of the shape memory alloy wires, each of the plurality of the second connecting claws connects to another end of the corresponding one of the shape memory alloy wires.

15. The camera module of claim 8, wherein each of the plurality of first connecting claws comprises a first base and a plurality of first connecting portions, the plurality of first connecting portions is disposed on a side of the first base, each of the plurality of the first connecting portions defines a first threading hole, one end of each of the shape memory alloy wires is arranged in the first threading hole.

16. The camera module of claim 8, wherein each of the plurality of second connecting claws comprises a second base and a plurality of second connecting portions, the plurality of second connecting portions is disposed on a side of the second base, each of the plurality of the second connecting portions defines a second threading hole, one end of each of the shape memory alloy wires is arranged in the second threading hole.

17. The camera module of claim 8, further comprising a cover plate and an insulating plate, wherein the cover plate connects the plurality of side plates to cover the receiving groove, the insulating plate is disposed between the cover plate and the rigid printed circuit board.

18. The camera module of claim 8, wherein the insulating plate defines a first through hole, the cover plate defines a second through hole, the first through hole faces the second through hole, portion of the flexible printed circuit board passes through the first through hole and the second through hole to connect portion of the movable plate is exposed by the first through hole and the second through hole.

19. The camera module of claim 8, wherein one side of the elastic member connects to the movable plate by a heat conductive glue, another opposite side of the elastic member connects to the bottom plate by solder or a heat conductive glue.

20. An electronic device comprising: a camera module, wherein the camera module comprises:
 a lens assembly,
 a sensor,
 a flexible printed circuit board, and
 a driving assembly, wherein the driving assembly comprising:
 a bottom box,
 an elastic member,
 a movable plate,
 a rigid printed circuit board; and
 a plurality of shape memory alloy wires;
  wherein the bottom box comprises a bottom plate and a plurality of side plates connected to the bottom plate, the plurality of side plates and the bottom plate cooperatively define a receiving groove, the plurality of side plates defines a position groove connecting to the receiving groove; the elastic member, the movable plate, the plurality of shape memory alloy wires, and a portion of the rigid printed circuit board are disposed in the receiving groove, another portion of the rigid printed circuit board is disposed in the position groove;
 the elastic member connects between the bottom plate and the movable plate, the plurality of shape memory alloy wires connects between the movable plate and the rigid printed circuit board,
 the flexible printed circuit board comprises a connecting end portion and a free end portion, the connecting portion connects the movable plate, the sensor is disposed on the connecting portion, the lens assembly faces the sensor, the flexible printed circuit board connects the rigid printed circuit board electronically.

\* \* \* \* \*